United States Patent [19]
Daniels

[11] 3,815,403
[45] June 11, 1974

[54] PUNCHING-FABRICATING APPARATUS INTERFACE MECHANISM

[75] Inventor: Dennis Daniels, Bellevue, Wash.

[73] Assignee: U.S. Amada Ltd., South Seattle, Wash.

[22] Filed: Dec. 4, 1972

[21] Appl. No.: 311,885

[52] U.S. Cl.................... 72/405, 72/7, 72/DIG. 22, 83/71, 83/151
[51] Int. Cl............................................ B21d 43/28
[58] Field of Search.......... 72/7, 324, 335, DIG. 22, 72/420, 379, 405; 83/23, 71, 112, 119, 157, 404, 405

[56] References Cited
UNITED STATES PATENTS

| | | | |
|---|---|---|---|
| 2,937,553 | 5/1960 | Sherman | 83/23 |
| 3,453,855 | 7/1969 | Morita | 72/405 |
| 3,498,167 | 3/1970 | Hill | 83/71 |
| 3,514,991 | 6/1970 | Merrill et al. | 72/420 |
| 3,518,908 | 7/1970 | Daniels | 83/409 |
| 3,610,017 | 10/1971 | Harris | 72/421 |
| 3,657,952 | 4/1972 | Brockbank | 83/408 |
| 3,670,611 | 6/1972 | Jarman | 83/157 |
| 3,717,061 | 2/1973 | Daniels | 83/552 |

Primary Examiner—Charles W. Lanham
Assistant Examiner—M. J. Keenan

[57] ABSTRACT

A system of punching, transferring, shearing, stacking, and/or forming is employed. An interface transferring mechanism is integrally provided on the punching apparatus and has a secondary workpiece gripping clamp alignable with the primary workpiece gripping clamps of the punching apparatus. A pivotal arm supports the secondary workpiece gripping clamp and is operable to pivot the workpiece off the workpiece supporting table of the punching apparatus and onto a stacking mechanism, shearing table, forming apparatus or the like. When used with the shearing apparatus, the secondary workpiece gripping clamp can be fed toward the shearing blade by the workpiece positioning means of the punching apparatus. An automatic folding machine includes a transfer table suitable for moving the workpiece to an inclined workpiece supporting surface on the folding machine. The transfer table includes retractable frictional conveyor belts that control movement of the workpiece so that it may be raised to an inclined position and positively fed at a controlled rate onto the inclined supporting surface.

20 Claims, 8 Drawing Figures

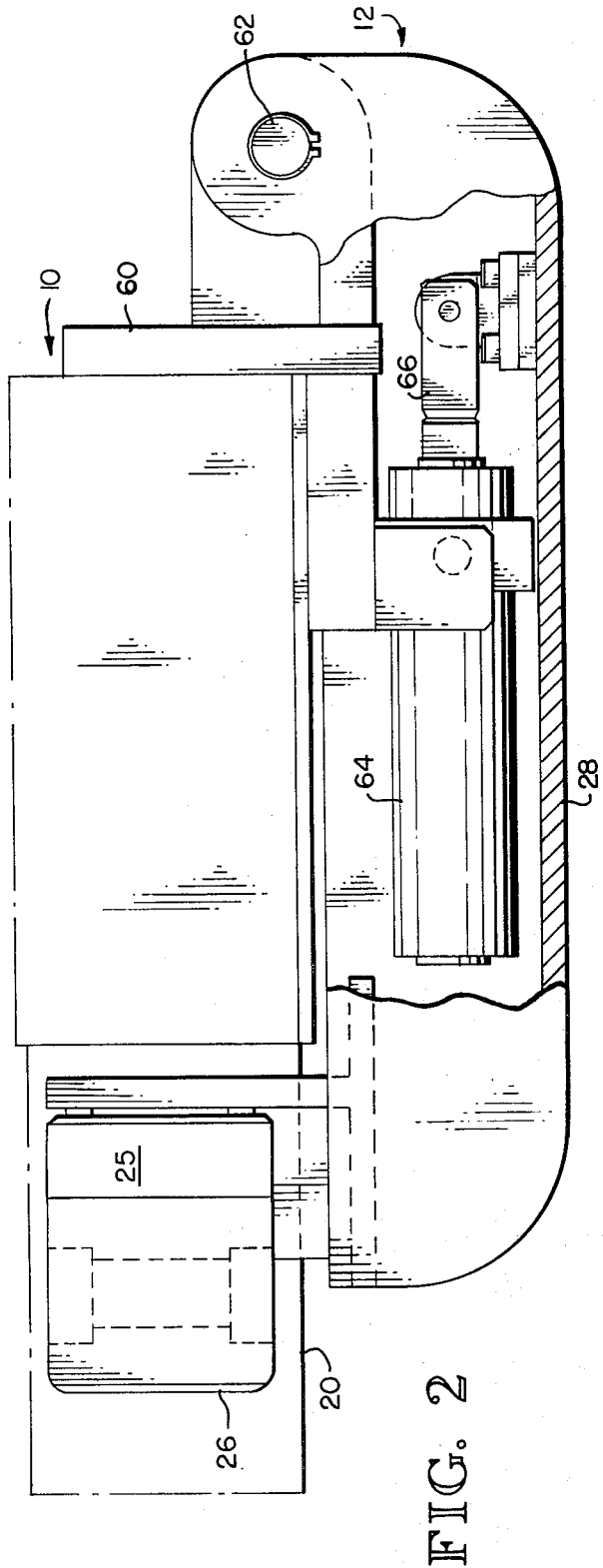
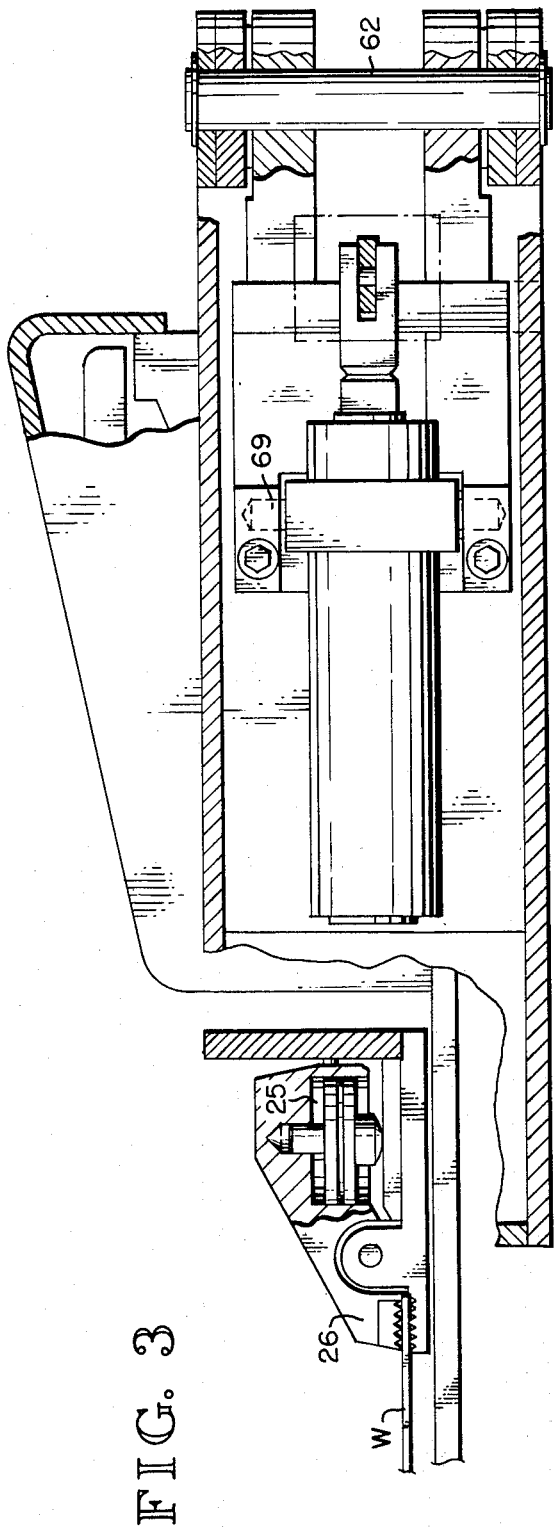
FIG. 2
FIG. 3

PUNCHING-FABRICATING APPARATUS INTERFACE MECHANISM

BACKGROUND OF THE INVENTION

1. Field of the Invention

This invention pertains to sheet material fabricating apparatus and more particularly, to automatically controlled systems for punching and performing subsequent fabricating operations on sheet material workpieces and to an interface transferring mechanisms between punching apparatus and subsequent fabricating apparatus.

2. Description of the Prior Art

Heretofore, the fabricating of sheet material including the punching, shearing, forming and like operations, has been carried out on individual independently operated pieces of equipment with the generally accepted mode of transferring the workpiece between the various equipment being manual or by the use of another independent transferring mechanism. As a result, the independent operations were always uncoordinated leading to time consuming transferring operations and to the expense of several independent pieces of equipment which frequently were incompatible with each other.

SUMMARY OF THE INVENTION

It is an object of this invention to provide a system of integrating punching, shearing, forming or like operations suitable for fabricating sheet material.

It is another object of this invention to provide a system for automatically using the numerical control and workpiece positioning means of a punching apparatus for positioning a workpiece in a subsequent workpiece fabricating apparatus.

It is still another object of this invention to provide a system for punching and delivering the punched workpiece automatically to an automated forming apparatus.

It is still another object of this invention to provide an inexpensive interface transferring mechanism integrally carried by the punching apparatus that is readily compatible with subsequent fabricating apparatus.

Basically, the system objects of this invention are obtained by integrally connecting workpieces transferring means onto the punching apparatus and tying it directly to the controls of the punching apparatus. The transferring means thus automatically moves the workpiece to a subsequent fabricating apparatus, such as a shearing, welding, corner shearing, hole countersinking, forming apparatus, or the like, or merely loads the workpiece onto a stack or conveyor. By making the transferring means an integral component of the punching apparatus, it is readily coordinated with the movements of the workpiece positioning means of the punching apparatus, both in its operational sequence, and its ability to receive the workpiece when the punching operation is completed. By making the transferring means an integral component of the punching apparatus, the transferring means becomes merely another inexpensive component of the punching apparatus, rather than an independent costly mechanism requiring its own means of support and expensive compatible control circuitry for tying in with the punching apparatus. For example, alignment of the transferring mechanism with the workpiece positioning means of the punching apparatus takes place during the manufacture of the punching apparatus and remains perfectly aligned during subsequent installation in the customer's plant.

When the subsequent fabricating operation is an operation that requires further movement of the workpiece in a direction parallel to the Y axis of the punching apparatus, as in a shearing operation, the integral interconnection of the transferring means to the workpiece positioning means of the punching apparatus advantageously allows the controls and workpiece positioning means of the punching apparatus to be used to move the workpiece through the subsequent fabricating apparatus. When the subsequent fabricating operation employs forming or folding, it may advantageously be coordinated with the apparatus disclosed in my earlier co-pending application entitled "N.C. Automatic Folding Machine", Ser. No. 186,062, filed Oct. 4, 1971.

The system can be used to its optimum advantage by combining a punching apparatus with two integral transferring mechanisms to deliver workpieces to both a shearing apparatus and a forming apparatus or other suitable fabricating apparatus.

One of the key features of the invention is the transferring mechanism itself. The mechanism advantageously employs a workpiece gripping clamp similar to the type utilized conventionally in punch presses so that it may act on an edge of the workpiece irrespective of the pattern or type of holes that are placed in the workpiece during the punching operation. Regardless of the subsequent stacking or fabricating operation employed, the workpiece gripping clamp being integrally connected to the punching apparatus can both support the workpiece and control its position. In the preferred form of the invention, a pivotable arm is employed to position the workpiece gripping clamp so that the workpiece can be swung off the punching apparatus and onto another table positioned closely adjacent thereto. A preferred application for the transferring mechanism is in conjunction with the punching apparatus illustrated in my earlier co-pending patent application entitled "Punch Press", Ser. No. 113,040, filed Feb. 19, 1971, now U.S. Pat. No. 3,717,061. The transferring mechanism by being integral is thus inexpensive and well coordinated to the punching apparatus.

BRIEF DESCRIPTION OF THE FIGURES OF THE DRAWINGS.

FIG. 2 is a fragmentary plan of the apparatus shown in FIG. 1.

FIG. 3 is a side elevation of the apparatus shown in FIG. 2.

DETAILED DESCRIPTION OF THE PREFERRED EMBODIMENTS

Figure 1:
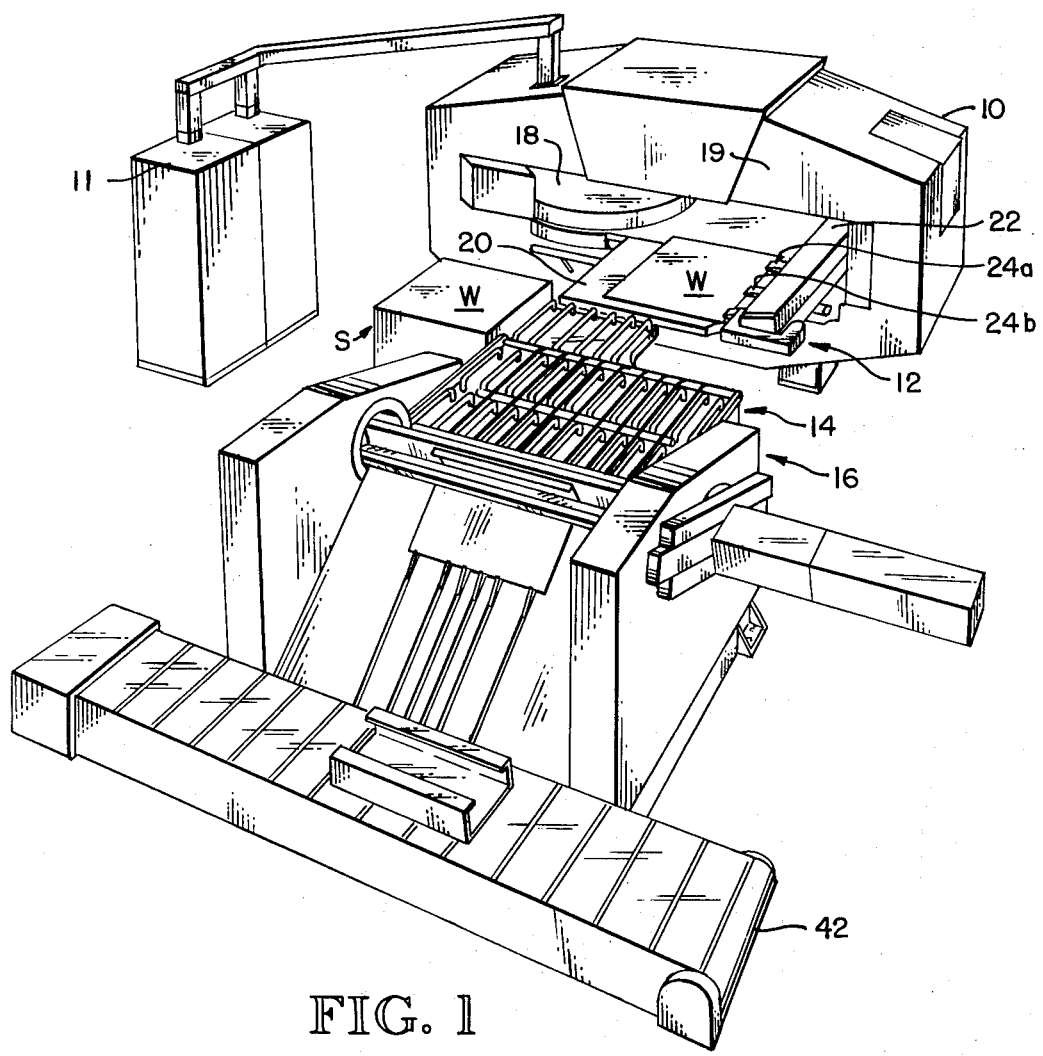
FIG. 1 is a perspective illustration of a punching and fabricating system embodying the principles of the invention and employing the unique transferring means of the invention.

The system illustrated in FIG. 1 employs a numerically controlled punch press 10 of the type illustrated in my co-pending application, Ser. No. 113,040, filed Feb. 19, 1971, now U.S. Pat. No. 3,717,061, the description of which is hereby incorporated by reference and made a part hereto. The punch press is automatically controlled by a numerical control means 11 of the type conventionally employed in this field. In addition, of course, the punch press and subsequent fabricating operations embodied in this invention, can be controlled manually by a conventional remote push button control console. The advantages of the invention are best obtained, however, by the complete automation of the entire system. The transferring means 12 is integrally connected to the punch press and is positionable adjacent a transfer table 14 employed in conjunction with a forming apparatus 16, preferably of the type illustrated in said co-pending application, Ser. No. 186,062, the description of which is hereby incorporated and made a part hereof by reference thereto. Although the system may take various forms, and the transferring means is employable for various uses, for the purposes of clarity the system will first be described in conjunction with a subsequent forming operation.

The punching apparatus 10 employs a turret 18 having various punches and dies, a workpiece supporting table 19, having in the preferred embodiment movable side tables 20, and workpiece positioning means 22 of the type employing conventional primary workpiece gripping clamps 24a and 24 b. With this type of punching apparatus, a workpiece W is manually fed from a stack S into the clamps at a loading station adjacent the stack. Subsequent operation of the punching apparatus will carry the workpiece through an entire punching operation under the control of the numerical control 11, finally delivering the workpiece to a position where it is ready for transfer or discharge by the transfer means 12. The clamps 24a and 24b each employ conventional automatically controlled means 25 for opening and closing the clamps on the workpiece.

Figure 4:
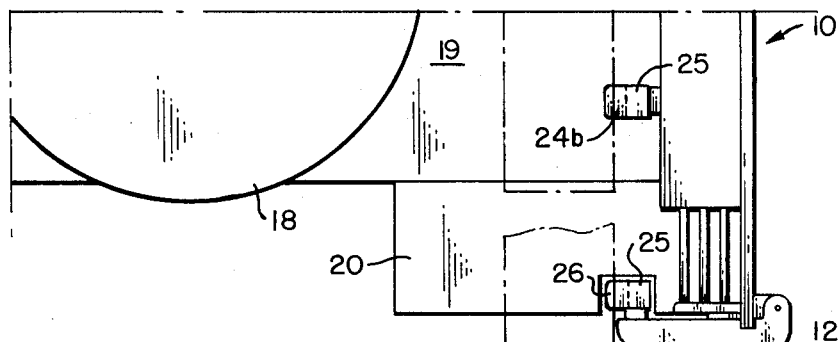
FIG. 4 is a schematic plan illustrating one form of the system employing the principles of the invention and in which the subsequent fabricating operation employs a forming apparatus.

As is readily apparent in FIG. 4 the transferring means 12 employs a secondary workpiece gripping clamp 26 having an identical means 25 for opening and closing the clamp. The clamp 26 is alignable as shown in FIG. 4 with the clamps 24a and 24b so that insertion of the workpiece W is accomplished by merely moving the workpiece along the X axis while completely retracted along the Y axis. By having the clamps all manufactured as an integral part of the punching apparatus this alignment can be set at the time of manufacture and be readily maintained throughout the useful life of the punching apparatus. The clamp 26 is secured at the end of an arm 28 which in a manner to be described in more detail below, is swingable about an arc for carrying the workpiece off the workpiece supporting side table 20 and simultaneously rotating the workpiece 90°.

Figure 6:
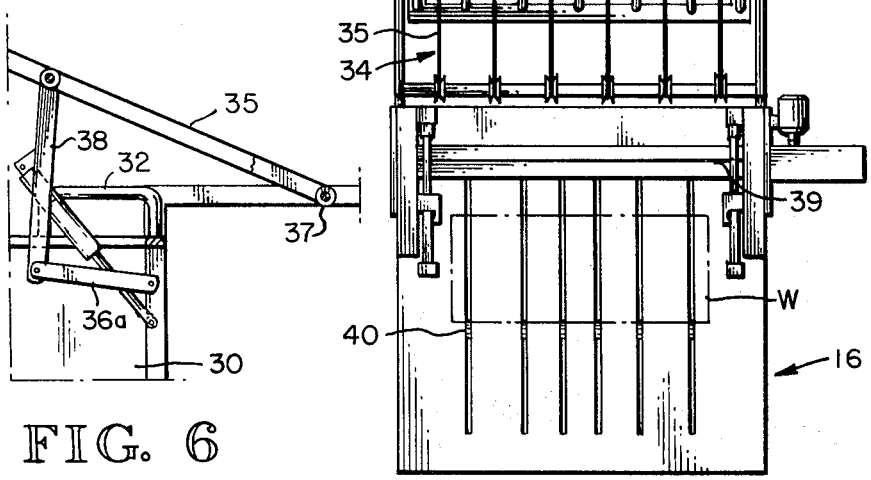
FIG. 6 is a fragmentary side elevation of the transfer table shown in FIG. 5.
Figure 5:
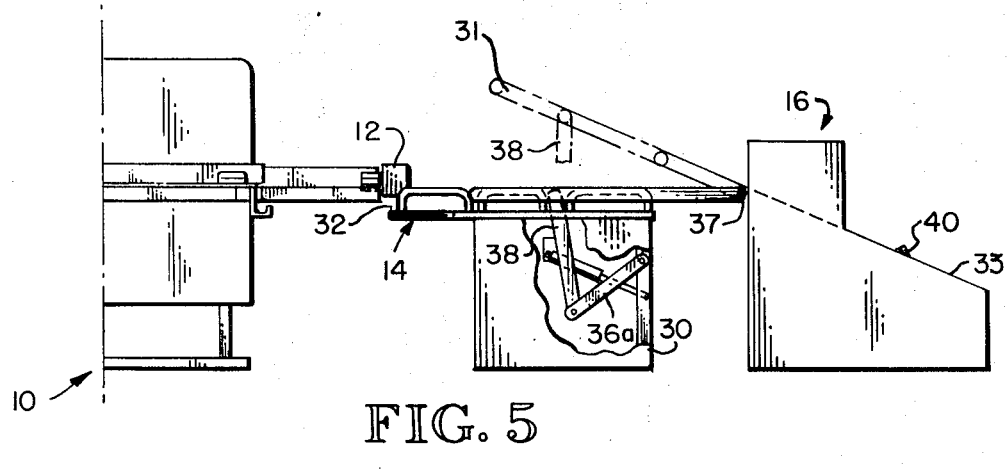
FIG. 5 is a side elevation of the system shown in FIG. 4.

The transfer table 14 employs a stationary frame 30 upon which is mounted a frame 31 tiltable about a pivot 37. In the preferred embodiment, a plurality of tubular bars 32 are fixed to the frame 30 and are transversely spaced across the frame 31. The frame 31 rests between the bars and carries conveying means 34 for moving the workpiece onto an inclined surface 33 of the forming apparatus 16. The conveying means 34 includes a plurality of rubberized belts 35, entrained about a set of sheaves which are mounted on crossshafts secured to the tiltable frame. The tiltable frame thus raises the belts above the bars 32. As is readily apparent, the workpiece can be slid over the bars 32 while the belts 35 are retracted, but after the belts are raised, the workpiece will cling to the belts even though tilted to the inclined position shown in FIGS. 5 and 6. Subsequent downward movement of the belts will allow the workpiece to be positively moved at a controlled rate and without unwanted rotation as it is moved onto the inclined surface of the forming apparatus 16.

In the preferred embodiment, the forming apparatus employs stop 40 which position the workpiece W through the forming operation. The stops are accurately aligned and are movable upwardly along the inclined surface 35 to feed the workpiece past the forming anvil and punch 39 of the forming apparatus. In this preferred apparatus, the stops 40 are raised to their uppermost position to receive the workpiece W being fed by the belts 35. If the workpiece is slightly askew when it reaches the stops, it will be stopped as its most advanced corner and be continually positively fed by the belts. The belts will allow slight slippage to straighten the workpiece as it is fed until all of the stops 40 are engaged by the leading edge of the workpiece. At this time, the workpiece is perfectly aligned for the forming operation. After the piece is formed, and as more clearly described in said application Ser. No. 186,062, the workpiece is removed by a discharge conveyor 42.

A cut-out 48 is provided in the table 14 to allow the arm 28 to pass adjacent the table. The cut-out in the embodiment illustrated terminates adjacent the longitudinal centerline of the table so that the workpiece positioning means of the punching apparatus 10 can move smaller workpieces parallel to the Y axis to center the workpiece transversely on the table 14 for central delivery to the forming apparatus 16.

Figure 7:
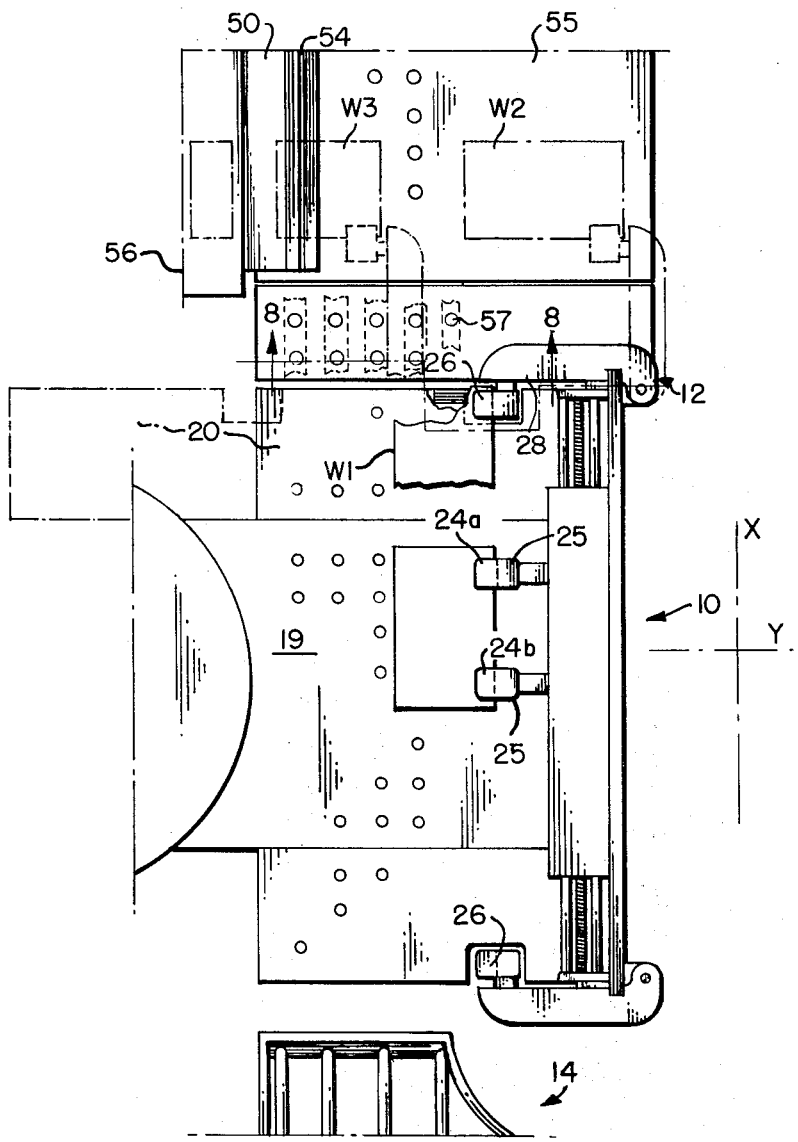
FIG. 7 is a schematic plan of a system employing two subsequent fabricating operations in which a shearing apparatus and a forming apparatus are employed.
Figure 8:
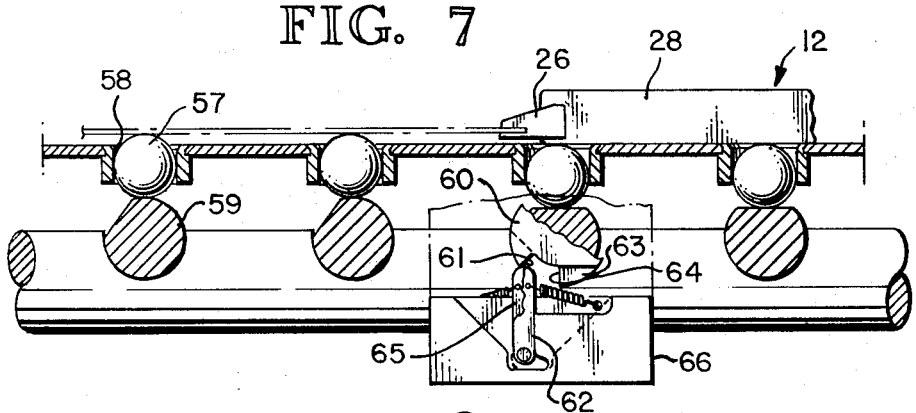
FIG. 8 is a fragmentary vertical section looking generally in the direction of arrows 8—8 in FIG. 7 but with the transferring mechanism 12 shifted to the left and with parts broken for clarity.

In the embodiment of the system illustrated in FIG. 7, the details of the punching apparatus 10 are identical to that of the embodiment shown in FIG. 4. Positioned closely adjacent the opposite table 20, however, is a shearing apparatus 50 of conventional type. As is well known, shearing apparatus employs an elongated shearing blade 54 and a table 55. One section of the table is provided with retractable workpiece supporting balls 57. The balls are retracted in generally the same manner as in the worktable 19 as described in application Ser. No. 113,040. More specifically, the balls rest in sockets 58 and are supported on elongated cam rods 59. The cam rods each have two cam plates fixed to an end thereof. An outer cam plate 60 has a slot 61 that is engaged by a spring biased pin 62 to rotate the cam bar clockwise as viewed in FIG. 7. An inner cam plate 63 has a slot 64 that is engaged by a second spring biased pin 65 to rotate the cam bars counterclockwise. The pins 62 and 65 are mounted on a slider 66 that is secured to the underside of the movable table 20 of the punch press 10. Thus movement of the arm 28 along the table 55 will avoid interference with the balls 57 by automatically retracting them as the arm approaches in a direction parallel to the Y axis. Sufficient balls are removed from the main section of the table 55 to allow the clamp 26 to move freely over the table when travelling toward the shear blade 54. Parts sheared from the workpiece may be collected in a box or conveyor 56 in a well known manner. As can be readily seen, the punching apparatus has two transferring means 12 so that the workpiece can be delivered after punching to either the shearing apparatus or the forming apparatus.

The operation of the shearing apparatus of the embodiment shown in FIG. 7 is performed by moving the punched workpiece to position W1. In this position, the workpiece is engaged by the clamp 26. Next the arm 28 rotates the workpiece 90° into position W2. From here on, the workpiece can be released from the arm and the completely independent control of the shearing apparatus 50 employed to take over the operation of the shear and the feeding of the workpiece throught the shear. It is a unique feature of this invention, however, that the numerical control and workpiece positioning mechanism of the punching apparatus can continue to feed the workpiece through the shearing apparatus greatly simplifying the controls for the shearing apparatus. For this purpose, the clamp 26 retains control of the workpiece and the workpiece positioning means of the punching apparatus continues to move the side table 20 and thus the arm 28 along the Y axis, past the shearing blade. The position of the workpiece W3 illustrates the position of the workpiece when the transfer arm 28 has been moved along the Y axis by the workpiece positioning mechanism of the punching apparatus.

The unique transferring means 12 of this invention, is best illustrated in detail in FIGS. 2 and 3. The punching apparatus has a framework 60 which supports a pivot 62. The arm 28 is pivotally mounted on the pivot 62 and is movable through an arc by a pneumatic cylinder 64 and its piston rod 66. The piston rod is pinned to the arm 28 whereas the cylinder is pivotally mounted in pins 69 that are secured to the frame 60. Extension of the piston rod 66 thus swings the arm 28 through its 90° arc from the position illustrated in FIG. 2.

While the preferred embodiments of the invention has been illustrated and described, it should be understood that alternatives and modifications will be readily apparent to one skilled in the art without departing from the principles of the invention. Accordingly, the invention is not to be limited to the specific embodiments described.

The embodiments of the invention in which an exclusive property or privilege is claimed are defined as follows:

1. Apparatus for punching, transferring and subsequently operating on flat workpiece comprising;
   controlled punching means having first workpiece supporting means and workpiece positioning means including primary workpiece clamps and means for moving the primary workpiece clamps in the X and Y axes;
   separate workpiece operating means for receiving the workpiece and performing some subsequent operation on the workpiece and having second workpiece supporting means independent of said first workpiece supporting means; and
   means on said punching apparatus independent of said primary workpiece clamps for engaging the workpiece at a predetermined location thereon relative to said primary workpiece clamps and transferring the workpiece onto a predetermined location on said separate workpiece operating means and in a predetermined alignment.

2. The apparatus of claim 1 said transferring means being coupled to said workpiece positioning means for moving the workpiece in at least one axis, said operating means including shearing means having a blade, said punching apparatus including control means for actuating the workpiece positioning means for positioning the workpiece both in the punching apparatus and also in the shearing means whereby the controls for the punching apparatus are operative to position the workpiece for subsequent shearing.

3. The apparatus of claim 2 wherein said control means for actuating said workpiece positioning means, said transferring means, and said shearing means are all automatically numerically controlled whereby punching, transferring and shearing are all done automatically from prearranged program or programs.

4. The apparatus of claim 1 said separate workpiece operating means including forming means having a workpiece supporting surface and a transfer table for receiving the workpiece and passing it to the workpiece supporting surface of the forming apparatus.

5. The apparatus of claim 4 said transfer table including workpiece supporting members, conveyor means positionable above said supporting members for moving the workpiece off said table and positionable below said supporting members to allow the transferring means to slide the workpiece onto the table without interference from said conveyor, said workpiece supporting surface of said forming means being inclined, means for tilting said conveyor means into alignment with said workpiece supporting surface of said forming means for moving the workpiece off the table onto said supporting surface of said forming means.

6. The apparatus of claim 5 said conveyor including means for holding said workpiece against sliding while inclined whereby movement of the workpiece off said transfer table is controlled by movement of the conveyor.

7. The apparatus of claim 6 said supporting members including a plurality of spaced tubular bars, said conveyor and workpiece holding means including a plurality of highly frictional belts movable above and below said bars whereby said belts when extending above said bars can move the workpiece straight and at a controlled rate onto said supporting surface of said forming apparatus.

8. The apparatus of claim 1 said operating means including a forming apparatus.

9. Apparatus for punching, transferring and subsequently operating on flat workpiece comprising; controlled punching means having workpiece supporting means and workpiece positioning means for moving the workpiece in the X and Y axes; workpiece operating means for receiving the workpiece and performing some subsequent operation on the workpiece, and means on said punching apparatus for transferring the workpiece to said operating means, said workpiece positioning means on said punching means including primary workpiece gripping clamp means, said transferring means including secondary workpiece gripping clamp means alignable with said primary workpiece gripping clamp means, means for mounting said secondary workpiece gripping clamp means on said punching means, and means for moving said secondary workpiece gripping clamp means off said punching workpiece supporting means and onto said operating means.

10. The apparatus of claim 9 said mounting and moving means for said secondary workpiece gripping clamp means including an arm pivotally coupled with said workpiece positioning means of said punching means and an actuator for pivoting said arm.

11. The apparatus of claim 9 said punching means including numerically controlled means for actuating said workpiece positioning means to move said primary workpiece gripping clamp means to a loading station, thence through punching operations and finally into alignment with said secondary workpiece gripping clamp means at a transferring station for placing the workpiece in said secondary workpiece gripping clamp means, and automatically closing the secondary workpiece gripping clamp means and opening the primary workpiece gripping clamp means to effect transfer of the workpiece.

12. The apparatus of claim 11 wherein said workpiece supporting means of said punching means includes a table movable with said workpiece positioning means and wherein said mounting and moving means for said secondary workpiece gripping clamp means is mounted on said movable table.

13. The apparatus of claim 1 including second transferring means on the opposite side of said punching means from said first transferring means, and second separate workpiece operating means positioned adjacent said second transferring means for receiving the workpiece from said punching means.

14. The apparatus of claim 13 said first separate workpiece operating means including a forming apparatus, said second separate operating means including a shearing apparatus.

15. Apparatus for punching, transferring and subsequently operating on flat workpieces comprising;
controlled punching means having workpiece supporting means and workpiece positioning means for moving the workpiece in the X and Y axes,
separate workpiece operating means located adjacent to said punching means and having second workpiece supporting means independent of said first workpiece supporting means,
pivotal transferring means having a workpiece holding clamp engageable with the workpiece in a predetermined accurately located and aligned position while on said punching means,
and means for pivoting said transferring means for moving said aligned workpiece off said punching means and onto a predetermined location on said separate operating means in a predetermined alignment.

16. Apparatus of claim 15 said pivotal transferring means including an arm, means mounting the arm on said controlled punching means and means for swinging the arm exactly 90° for accurately aligning the workpiece on said second workpiece supporting means.

17. Apparatus of claim 15 said workpiece positioning means of said punching means including primary workpiece clamps, said workpiece holding clamp of said transferring means being alignable with said primary workpiece clamps for grasping the workpiece at a known location on the workpiece.

18. Apparatus of claim 1 said transferring means including a secondary workpiece clamp positionable at a predetermined location on said workpiece and means for accurately swinging the secondary workpiece clamp off said first workpiece supporting means onto said second workpiece supporting means in an exact known alignment relative to said primary workpiece clamps for accurately locating the workpiece on said second workpiece supporting means.

19. Apparatus of claim 18 said second workpiece supporting means located alongside of said first workpiece supporting means.

20. Apparatus of claim 13 said first and second separate operating means each having independent workpiece supporting means located adjacent and laterally of said first workpiece supporting means.

* * * * *